J. A. SCHUCHARDT, Sr. & J. A. SCHUCHARDT, Jr.
BRAKE OPERATING MECHANISM.
APPLICATION FILED OCT. 25, 1909.
952,759.
Patented Mar. 22, 1910.
2 SHEETS—SHEET 1.
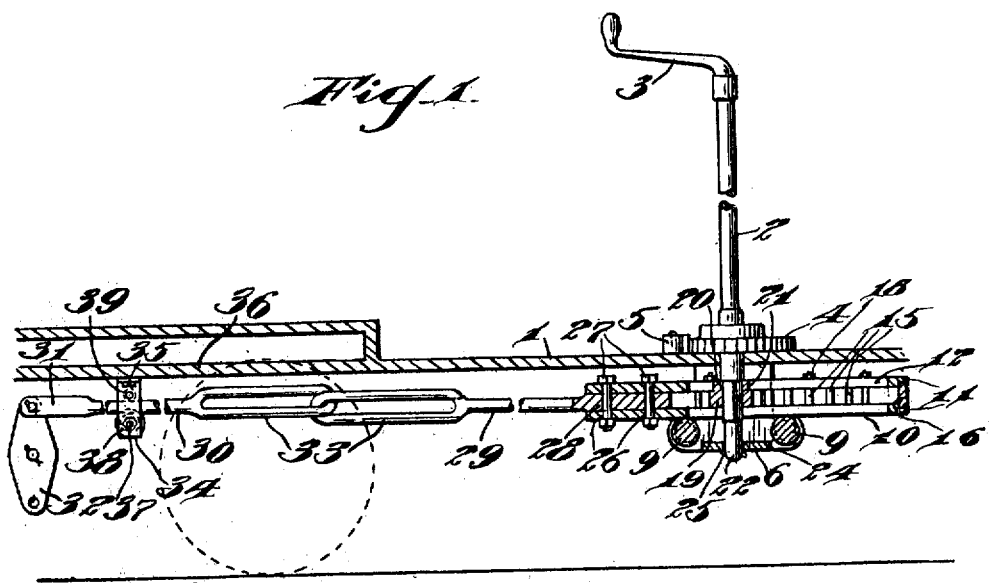
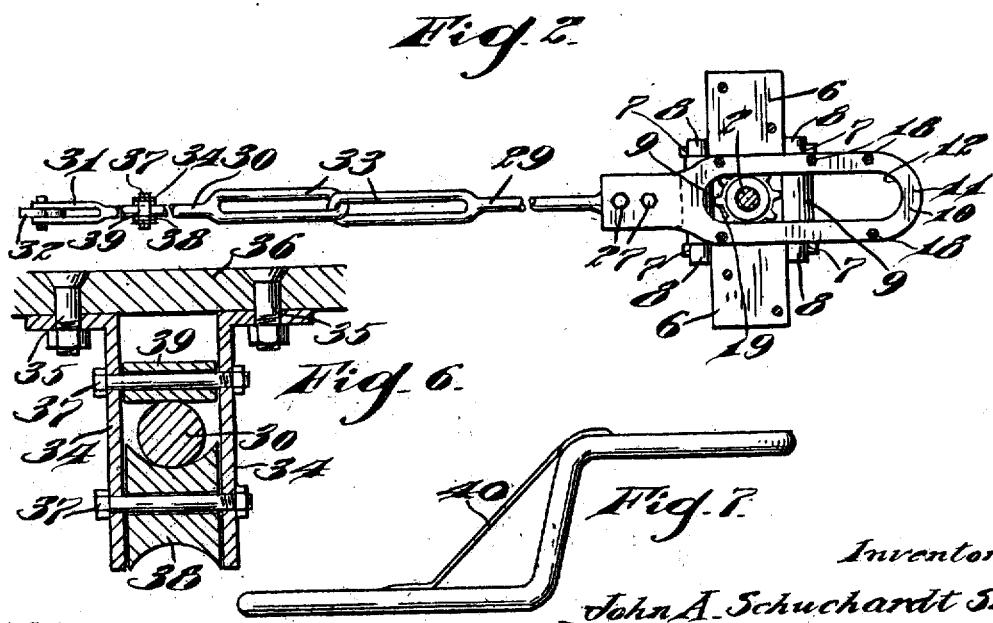

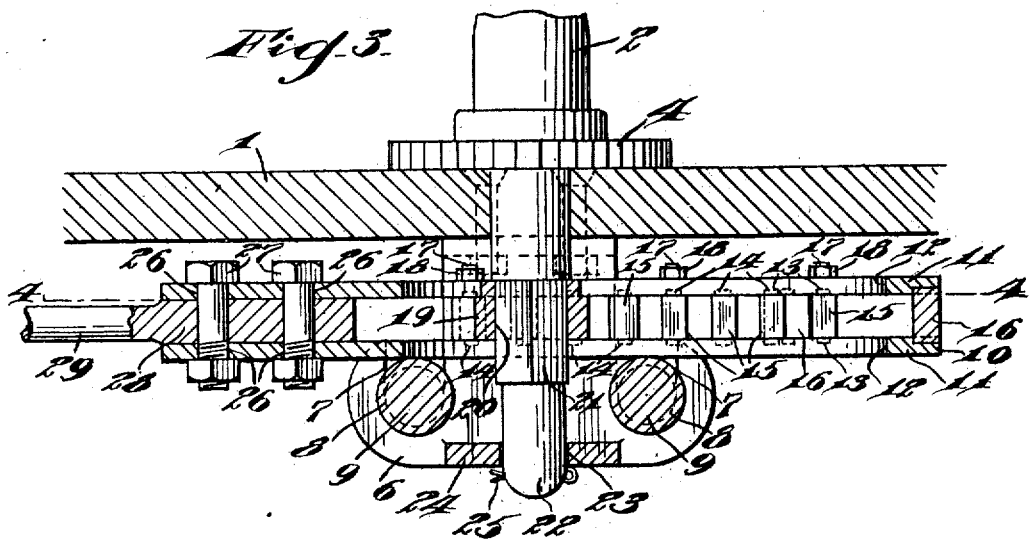
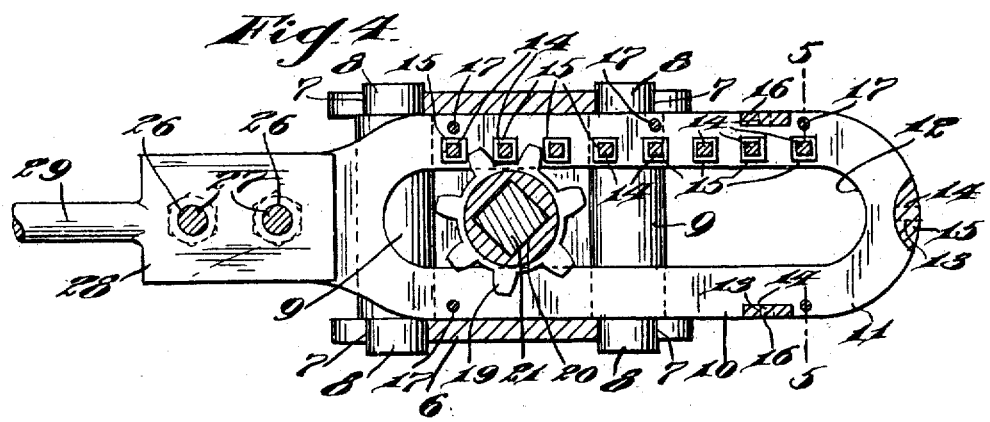
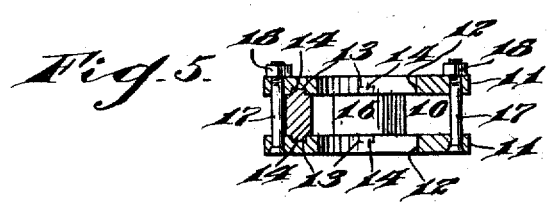

UNITED STATES PATENT OFFICE.

JOHN A. SCHUCHARDT, SR., AND JOHN A. SCHUCHARDT, JR., OF NEW CASTLE, DELAWARE, ASSIGNORS OF ONE-THIRD TO JOHN RIES, OF NEW CASTLE, DELAWARE.

BRAKE-OPERATING MECHANISM.

952,759.

Specification of Letters Patent. Patented Mar. 22, 1910.

Application filed October 25, 1909. Serial No. 524,339.

*To all whom it may concern:*

Be it known that we, JOHN A. SCHUCHARDT, Sr., and JOHN A. SCHUCHARDT, Jr., citizens of the United States, residing at New Castle, in the county of Newcastle and State of Delaware, have invented certain new and useful Improvements in Brake-Operating Mechanisms, of which the following is a specification.

Our invention relates to improvements in brake operating mechanisms, an object of the invention being to provide improvements of this character which dispense with the necessity for chains or other flexible connecting devices that are liable to become broken in use, and give to the connecting device, a certain flexibility or lost motion, rendering the operation of the brake more or less unreliable, whereas with our improvements, a practically instantaneous response from the brake shaft to the brake is obtained.

A further object is to provide an improved construction and mounting for a reciprocating rack, operated by a pinion on the brake shaft, and provided with an improved connection between the said rack and the brake-operating lever.

With these and other objects in view, the invention consists in certain novel features of construction and combinations and arrangements of parts, as will be more fully hereinafter described and pointed out in the claims.

In the accompanying drawings, Figure 1, is a view partly in longitudinal section, and partly in side elevation illustrating our improvements. Fig. 2, is a plan view of the rack and its connection with the brake lever. Fig. 3, is an enlarged view in longitudinal section through the rack and its mounting. Fig. 4, is a view in section on the line 4—4 of Fig. 3. Fig. 5, is a view in section on the line 5—5 of Fig. 4. Fig. 6, is an enlarged view in cross section of the bracket or hanger 34, and Fig. 7, is a view in side elevation of a modified form of connecting rod.

1 represents a car plaform, on which is mounted the ordinary brake shaft 2, having the ordinary crank arm 3 at its upper end. This shaft projects through platform 1 and is provided above the platform with the ordinary ratchet-wheel 4 and dog 5 to lock the shaft when the brake is applied. Below the platform 1, and secured thereto, is a cast bracket 6 having bearings 7 for the trunnions 8 of rollers 9, said rollers being disposed in horizontal position and parallel to each other and affording a support for our improved rack 10. The rack 10 comprises two parallel plates 11—11, one disposed above the other, and both having central longitudinal slots 12. These plates are provided, at one side, with a series of registering sockets 13, constituting mortises, into which tenons 14 on the ends of blocks 15 are positioned, said blocks being located in alinement and an equal distance apart, so as to constitute a series of teeth, forming a rack. The plates 11—11 are also spaced apart by means of blocks 16 which are likewise provided with tenons to enter sockets in the plates, and bolts 17 are passed through said plates and secured by nuts 18 to effectually clamp the plates, at opposite sides of the blocks 15 and 16 and secure the structure together. This rack is operated by a pinion 19 which is provided with an angular bore 20 to receive the angular portion 21 of shaft 2.

The extreme lower end of shaft 2 is cylindrical as shown at 22 and projects through an opening 23, in the bottom 24 of bracket 6, and a cotter pin 25 is positioned in an opening in the shaft below the bottom 24 so as to prevent any upward movement of shaft 2 and insure a proper relation between the shaft and pinion 19. The pinion 19 is adapted to engage the teeth 15 and is positioned between the plates 11, and when said pinion is turned by the shaft 2, the plates will be moved longitudinally on rollers 9, as will more fully hereinafter appear. These plates 11—11, at one end, are made with registering openings 26 to receive bolts 27, which latter are passed through openings in a block 28 integral with rod 29. 30 also represents a rod which is bifurcated at one end as shown at 31, and pivotally connected to one end of the brake-operating lever 32, and these rods 29 and 30 are made with loops or links 33 at their adjacent ends, which are coupled together as shown. The coupling is accomplished by first separating the members of one of said links, and after coupling the links, the separated members of the said link are welded together, so as to form virtually an integral structure. One or both of these rods 29 and 30 are supported against vertical movement by means of a bracket 34, which comprises two members secured by bolts 35 to the car bottom 36 and having registering openings to receive parallel bolts 37. On the lower of these bolts 37, the concave roller 38 is mounted, and upon which rod 30, in this instance, is supported and a cylindrical roller 39 is mounted on the upper bolt 37 above rod 30 so as to prevent any upward movement of the rod.

Where the brake-operating lever is at a lower elevation than is the operating rack 10, it is necessary to make one or both of the rods of angular form as shown in Fig. 7, in which instance a strengthening brace 40 will be provided, so as to make the rod rigid. It will thus be observed that with our improvements, a substantially rigid connection is provided between the rack and the brake-operating lever, which overcomes any lost motion, and the structure is a strong and durable one, not liable to become broken or injured in use, and which overcomes the many defects of the ordinary brake chain in common use.

Various slight changes might be made in the general form and arrangement of parts described without departing from our invention, and hence we do not restrict ourselves to the precise details set forth, but consider ourselves at liberty to make such changes and alterations as fairly fall within the spirit and scope of the appended claims.

Having thus described our invention, what we claim as new and desire to secure by Letters Patent, is:—

1. In a device of the character described, the combination with a brake-operating lever and a brake shaft, of a rack, a pinion on the brake shaft engaging the teeth of the rack to reciprocate the latter, a rod connected at one end to the brake lever, a second rod connected at one end to the rack, an integral loop on the end of each of said rods, and said loops coupled together.

2. In a device of the character described, the combination with a brake-operating lever and brake-operating shaft, of a bracket support, rollers in said bracket a rack mounted to move on said rollers, and pinion on said shaft engaging the teeth of said rack.

3. In a device of the character described, the combination with a brake-operating lever and a brake shaft, of a bracket support, rollers in said bracket support, a rack mounted to move on said rollers and having a slot for the accommodation of said brake shaft, said rack comprising two parallel plates, teeth between said plates and bolts clamping said plates together, a pinion secured to turn with said shaft, and mesh said teeth, a rod secured at one end between said plates, a second rod secured at one end to said brake-operating lever, and loops or links at the ends of said rods coupled together.

4. In a device of the character described, the combination with a brake-operating lever and a brake shaft, of a bracket support, rollers in said bracket support, a rack mounted to move on said rollers and having a slot for the accommodation of said brake shaft, said rack comprising two parallel plates, teeth between said plates, bolts clamping said plates together, a pinion secured to turn with said shaft, and mesh said teeth, a rod secured at one end between said plates, a second rod secured at one end to said brake-operating lever, loops or links at the end of said rods coupled together, a fixed bracket, and rollers supported in said bracket and between which one of said rods is adapted to move.

5. In a device of the character described, the combination with a bracket, rollers in the bracket, of a rack comprising two parallel plates spaced apart and having longitudinal slots, said plates having a series of registering recesses or mortises, a series of blocks, tenons on said blocks positioned in said mortises, said blocks constituting a toothed rack, other blocks positioned between said plates, bolts projected through the said plates, nuts on the ends of said bolts clamping said plates and all of said blocks together, a brake shaft projecting through the slots in said plates and through the bottom of said bracket and having an angular portion, a pinion located on the angular portion of said shaft and in mesh with said teeth, a pin projected through the lower end of said shaft below the bottom of the bracket, and said rack adapted to operate a brake.

6. In a device of the character described, the combination with a bracket, rollers in the bracket, of a rack comprising two parallel plates spaced apart and having longitudinal slots, said plates having a series of registering recesses or mortises, a series of blocks, tenons on said blocks positioned in said mortises, said blocks constituting a toothed rack, other blocks positioned between said plates, bolts projected through the said plates, nuts on the ends of said bolts clamping said plates and all of said blocks together, a brake shaft projecting through the slots in said plates and through the bottom of said bracket and having an angular portion, a pinion located on the angular portion of said shaft and in mesh with said teeth, a pin projected through the lower end of said shaft below the bottom of the bracket, a brake lever, a rod having a block at one end positioned between said plates, bolts projecting through said plates and block and clamping the block between the plates, a rod pivotally secured at one end to the brake operating lever, and links or loops at the ends of said rods coupled together.

In testimony whereof we have signed our names to this specification in the presence of two subscribing witnesses.

JOHN A. SCHUCHARDT, Sr.
JOHN A. SCHUCHARDT, Jr.

Witnesses:
JOHN G. KING,
CHARLES W. NICKERSON.